United States Patent
Lima et al.

(10) Patent No.: US 9,450,624 B2
(45) Date of Patent: Sep. 20, 2016

(54) INTERFERENCE CANCELLATION AND IMPROVED SIGNAL-TO-NOISE RATIO CIRCUITS, SYSTEMS, AND METHODS

(71) Applicant: STMICROELECTRONICS (CANADA), INC., Nepean (CA)

(72) Inventors: Jose Augusto Lima, Stittsville (CA); Antonio Mascioli, Nepean (CA)

(73) Assignee: STMicroelectronics (Canada), Inc., Nepean (CA)

( * ) Notice: Subject to any disclaimer, the term of this patent is extended or adjusted under 35 U.S.C. 154(b) by 0 days.

(21) Appl. No.: 14/578,119

(22) Filed: Dec. 19, 2014

(65) Prior Publication Data

US 2015/0180520 A1 Jun. 25, 2015

Related U.S. Application Data

(62) Division of application No. 13/298,254, filed on Nov. 16, 2011, now abandoned.

(60) Provisional application No. 61/429,034, filed on Dec. 31, 2010.

(51) Int. Cl.
*H04B 1/10* (2006.01)
*H04L 25/03* (2006.01)
*H04L 27/233* (2006.01)

(52) U.S. Cl.
CPC ............. *H04B 1/10* (2013.01); *H04L 25/0328* (2013.01); *H04L 27/233* (2013.01)

(58) Field of Classification Search
CPC ............. H04L 25/0328; H04L 27/233; H04L 27/366; H04L 2027/0061; H04B 1/10; H04B 2001/7152; H04B 1/1036; H04K 3/228
See application file for complete search history.

(56) References Cited

U.S. PATENT DOCUMENTS

| | | | |
|---|---|---|---|
| 5,410,750 A * | 4/1995 | Cantwell et al. | 455/306 |
| 6,034,564 A | 3/2000 | Iwamatsu | |
| 6,121,828 A | 9/2000 | Sasaki | |
| 6,131,013 A * | 10/2000 | Bergstrom et al. | 455/63.1 |
| 6,570,441 B1 | 5/2003 | Sasaki | |
| 8,055,235 B1 * | 11/2011 | Gupta et al. | 455/296 |
| 2002/0106043 A1 | 8/2002 | Sasaki | |
| 2003/0021367 A1 * | 1/2003 | Smith | 375/346 |
| 2003/0169102 A1 | 9/2003 | Kawai | |
| 2003/0174016 A1 | 9/2003 | Meyer | |
| 2006/0023811 A1 * | 2/2006 | Yoon | 375/326 |
| 2006/0109938 A1 * | 5/2006 | Challa | H04L 25/03006 375/347 |
| 2007/0195904 A1 * | 8/2007 | Kemenczy | H04L 25/0328 375/262 |
| 2009/0296863 A1 * | 12/2009 | Tirkkonen et al. | 375/346 |
| 2010/0159865 A1 * | 6/2010 | Fudge | 455/296 |

OTHER PUBLICATIONS

Tsividis, "Accurate Analysis of Temperature Effects in IC-VBE Characteristics with Application to Bandgap Reference Sources," *IEEE Journal of Solid-State Circuits* SC-15(6):1076-1084, 1980.

* cited by examiner

Primary Examiner — Aristocratis Fotakis
(74) Attorney, Agent, or Firm — Seed IP Law Group PLLC (57) ABSTRACT

Interference cancellation for wideband and narrowband communications systems is provided without apriori knowledge of statistical information about an interfering signal. In one embodiment a demodulator circuit can operate in an environment where a "no lock" situation would normally occur to remove the interference and acquire signals in low signal-to-noise ratio conditions and high signal-to-interference ration conditions. In other embodiments, performance is improved by introducing statistics of the interfering signal, and these statistics regarding the communications channel and interference properties (i.e., characteristics of the interfering signal) can be adaptive or "learned" in other embodiments.

20 Claims, 10 Drawing Sheets

INTERFERENCE CANCELLATION AND IMPROVED SIGNAL-TO-NOISE RATIO CIRCUITS, SYSTEMS, AND METHODS

CROSS-REFERENCE TO RELATED APPLICATION(S)

This application is a divisional application of U.S. patent application Ser. No. 13/298,254, filed Nov. 16, 2011, which claims benefit of U.S. Provisional Patent Application No. 61/429,034 filed Dec. 31, 2010, incorporated herein by reference.

BACKGROUND

1. Technical Field

Embodiments relate generally to communications systems and, more specifically, to demodulation circuits having interference cancellation and improved signal-to-noise ratio performance.

2. Description of the Related Art

In both narrowband and wideband communications systems interference cancellation is the process of removing or "cancelling" the degrading effects of a high power interfering signal that is spectrally adjacent to the input signal of interest (i.e., the desired input signal). This degradation is measured in terms of a reduced bit error rate (BER), reduced distance over which input signals may be communicated over the corresponding communications channel, and increased guard band protection resulting in lower efficiency utilization of the frequency or band of interest, as will be appreciated by those skilled in the art. The use of interference cancellation is prevalent in wideband systems such as cellular telephone systems, terrestrial wireless systems employing IEEE802.16 protocols, and in systems where a wideband, high power transmitter is co-located with a receiver bank, as will also be appreciated by those skilled in the art. In many situations the type or characteristics of the interference is known, or in other situations the interference cancellation system attempts to adaptively characterize or "learn" the type of interference prior to implementing approaches to remove or cancel this interference. There is a need for improved methods, circuits, and systems for interference cancellation in communications systems.

BRIEF SUMMARY

Embodiments are directed to circuits, systems, and methods of interference cancellation for wideband and narrowband communications systems without a priori knowledge of statistical information about an interfering signal. According to one embodiment, a demodulator circuit can operate in an environment where a "no lock" situation would normally occur to remove the interference and acquire signals in low signal-to-noise ratio (SNR) conditions and high signal-to-interference ratio (SIR) conditions. In other embodiments, performance is improved by introducing statistics of the interfering signal, and these statistics regarding the communications channel and interference properties (i.e., characteristics of the interfering signal) can be adaptive or "learned."

According to one embodiment, a demodulation circuit includes an interference estimation circuit adapted to receive an input signal and generate an interference estimation signal from the input signal and an adaptive filtering circuit coupled to the interference estimation circuit and operable to perform spectral inversion on the estimation signal to obtain an inverted signal that is then applied to the input signal to substantially cancel interference contained in the input signal.

DETAILED DESCRIPTION

Figure 1:
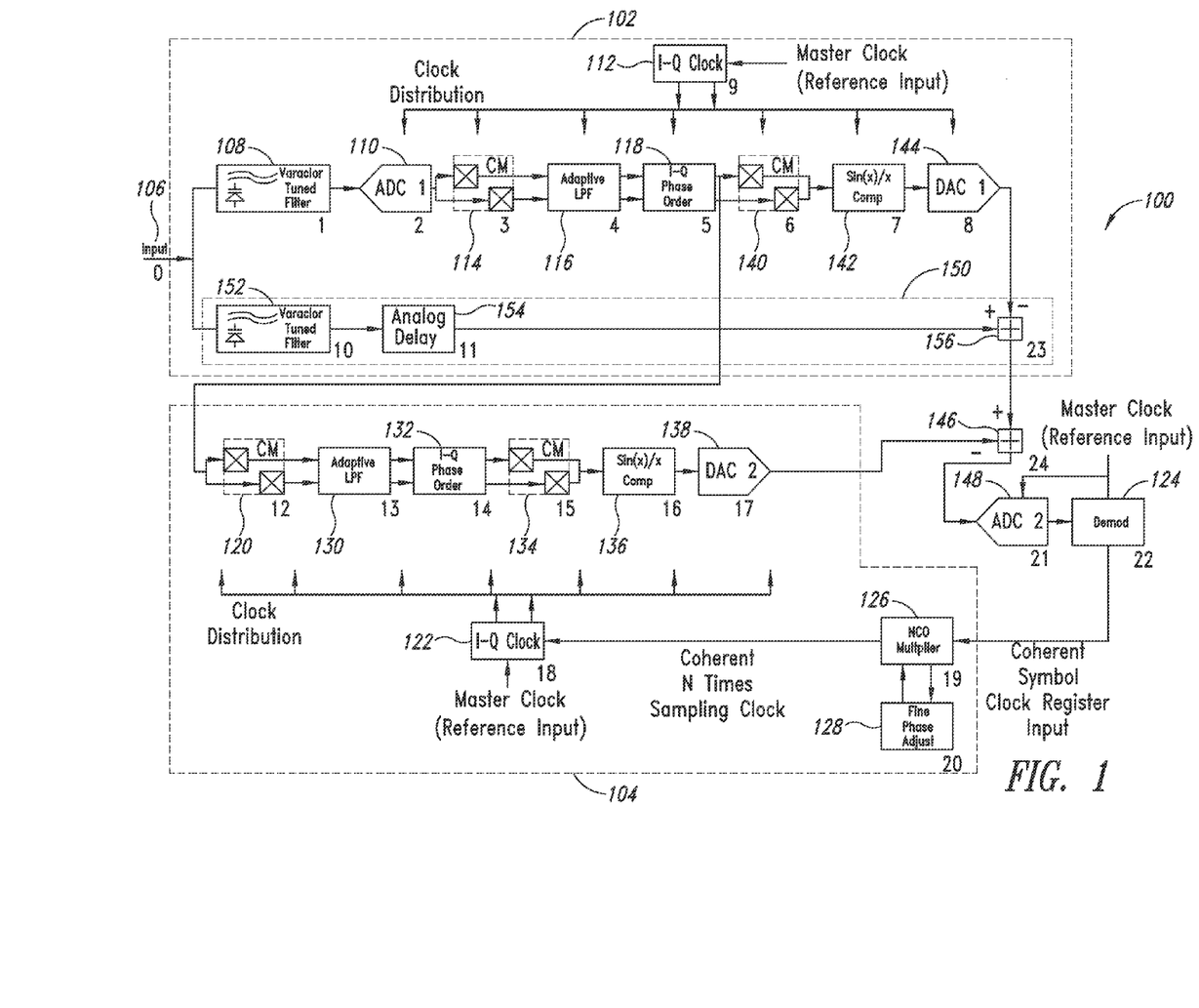
FIG. 1 is a functional block diagram of a demodulation circuit including an interference estimation circuit and adaptive filtering circuit according to one embodiment.

FIG. 1 is a functional block diagram of a demodulation circuit 100 including an interference estimation circuit 102 and an adaptive filtering circuit 104 contained in the demodulation circuit according to one embodiment. In operation, the interference estimation circuit 102 and an adaptive filtering circuit 104 cancel an interfering signal I present on an input signal 106 applied to the demodulation circuit 100, as will be explained in more detail below. The interference estimation circuit 102 and adaptive filtering circuit 104 detect and remove the interfering signal I on the input signal 106 without prior knowledge of the characteristics of the interfering signal. The adaptive filtering circuit 104 also utilizes "coherent" "knowledge" or information as derived from the demodulation circuit 100 to further remove degradation effects due to the interfering signal I, as will be described in more detail below.

In the present description, certain details are set forth in conjunction with the described embodiments to provide a sufficient understanding of the invention. One skilled in the art will appreciate, however, that the invention may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components or steps of any of the respective described embodiments may also be within the scope of the present disclosure although not expressly described in detail below. Finally, the operation of well-known components and/or processes has not been shown or described in detail below to avoid unnecessarily obscuring the present disclosure.

Figure 2:
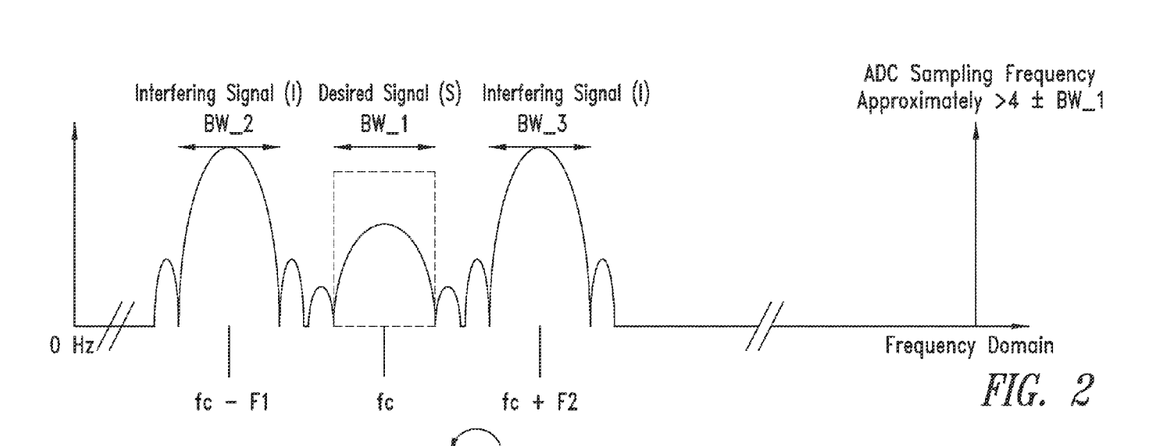
FIG. 2 is a graph illustrating characteristics of the input signal received by the interference estimation circuit of FIG. 1.

The demodulation circuit 100 receives the input signal 106 which includes a known signal of interest or desired signal S and the interfering signal I. This concept is illustrated in the graph of FIG. 2 showing the input signal 106. The interference estimation circuit 102 executes a "non-coherent" process while the adaptive filtering circuit 104 executes a coherent process in removing the unwanted interfering signal I from the input signal 106. In the example of FIG. 2, the input signal 106 is assumed to include the desired signal S and the interfering signal I to include adjacent interfering signals as illustrated. As will be discussed in more detail below with regard to FIG. 11, the signal-to-interference ratio (SIR) is the ratio of the average received modulated carrier power (i.e., power of desired signal S) to the average received co-channel interference power (i.e., power of interfering signal I). The co-channel interference is crosstalk from two different radio transmitters using the same frequency as a primary receiver containing the demodulation circuit 100 of FIG. 1, as will be understood by those skilled in the art. Also note that the desired signal S corresponds to the modulated signal that is transmitted by a primary transmitter and that is intended to be received by the primary receiver containing the demodulation circuit 100. The desired signal S portion of the input signal 106 contains data to be received by the primary receiver containing the demodulation circuit 100. The unwanted interfering signal I corresponds to a signal or signals from a secondary transmitter or transmitters that may also be received by the primary receiver, and which accordingly can degrade the performance of the primary receiver. Note that the term "data" that is being communicated through the desired signal S is used broadly herein to include any type of data, such as audio data, video data, programming instructions, communications protocol related information, and so on.

In FIG. 1, the input signal 106 may be represented by the signal structure shown in FIG. 2. The structure of the input signal 106, as shown in FIG. 2, includes the desired signal S and the unwanted interfering signal I. In the example of FIG. 2 the unwanted interfering signal I is assumed to include adjacent interfering signals as illustrated. Initially, the input signal 106 is filtered by a first varactor variable filter 108 that performs some initial "tuning" or filtering of the input signal 106 in order to coarsely "tune" the demodulation circuit 100 such that the input signal contains only the desired signal S and the interfering signal I that is to be removed from the input signal. This is so that subsequent processing by the remaining components of the interference estimation circuit 102 can remove the interfering signal I, as will be described in more detail below. Thus, the varactor variable filter 108 can be viewed as filtering the input signal 106 to isolate the interfering signal I that is to be removed from the input signal. It should be noted, however, the input signal 106 may of course include other interfering signals or noise not shown in FIG. 2, and in this situation the varactor variable filter 108 filters out such other interfering signals and noise such that the output of the varactor variable filter includes both the interfering signal I to be removed and the desired signal S as seen in FIG. 2.

An analog-to-digital converter (ADC) 110 samples the filtered input signal from the varactor variable filter 108, with this sampling adhering to the requirements of the Nyquist sampling theorem, and outputs digital values corresponding to these samples. An I-Q clock generator 112 generates a plurality of clock signals that are applied to appropriately clock the ADC 110 and other components in the interference estimation circuit 102. As seen in FIG. 2, the desired signal S has a bandwidth BW_1 and the clock signals from the clock generator 112 have a frequency that enables the entire spectrum of interest to be sampled by the ADC 110. In one embodiment, the clock generator 112 applies clock signals to the ADC 110 having a frequency corresponding to at least four times the bandwidth BW_1 of the desired signal S.

Figure 3:
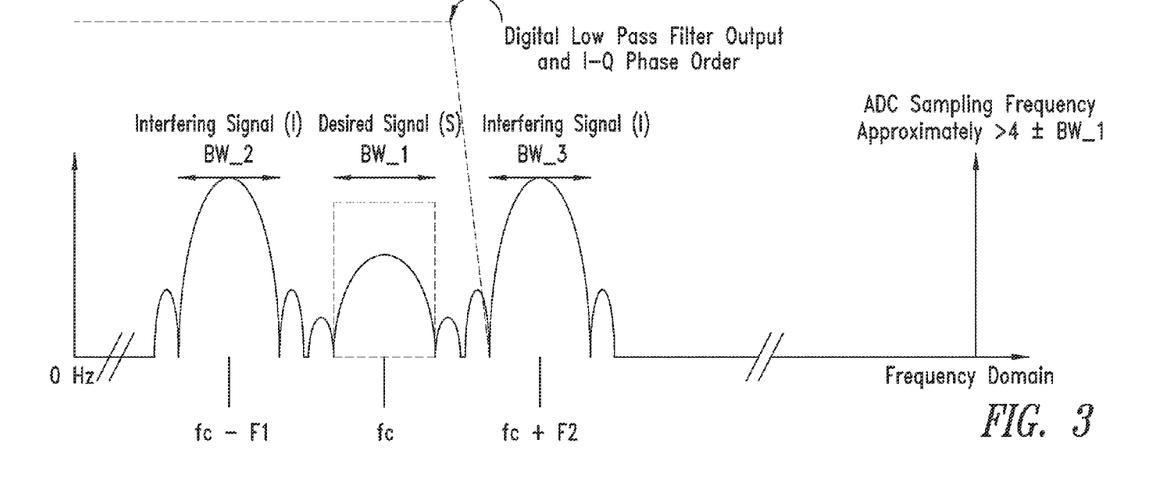
FIG. 3 is a graph illustrating the operation of the complex multiplier, adaptive low pass filter, and I-Q phase order filter in the interference estimation circuit of FIG. 1 in isolating a portion of the interfering signal and the desired signal of the input signal of FIG. 2.

A complex multiplier 114 receives these digital values from the ADC 110 and performs complex multiplication on these digital values to thereby effectively multiply this digital signal into baseband and form an equivalent I-Q sample set, as will be discussed in more detail below. An adaptive low pass filter 116 receives the I-Q sample set from the complex multiplier 114 and this filter in combination with an I-Q phase order filter 118 operate to filter this sample set to thereby isolate the multiplication images generated by the complex multiplication, and provide passband shaping in the form of adaptive filtering. In this way, the I-Q phase order filter 118 outputs an estimate of the interfering signal I to be removed as seen in FIG. 3. As seen in FIG. 3, the low pass filtering by the adaptive low pass filter 116 and operation of the I-Q phase order filter 118 results in an in-band portion (at center frequency fc-F1) of the interfering signal I being retained while an out-of-band portion (at center frequency fc-F2) of the interfering signal is rejected. The frequency fc is the center frequency of the desired signal S having bandwidth BW_1 as shown in FIG. 3. The in-band portion of the interfering signal I corresponds to that portion below a cutoff frequency as indicated by the dotted line in FIG. 3, and the out-of-band portion of the interfering signal corresponds to the portion above this cutoff frequency.

The output of the I-Q phase order filter 118 is supplied to a second complex multiplier 120 that is clocked by a clock generated by a second I-Q clock generator 122. This second I-Q clock generator 122 generates a clock that is corrected based upon corrections being applied by a demodulator circuit 124 on a symbol-by-symbol basis. More specifically, the demodulator circuit 124 demodulator provides symbol clock information to a numerically controlled oscillator (NCO) 126 which operates at a multiple of the symbol clock frequency and operates in combination with a fine phase adjustment circuit 128 to fine tune phase correction of the clock generated by the second I-Q clock generator 122. This coupling of the demodulator circuit 124 and the coherent symbol clock via the NCO 126 and fine phase adjustment circuit 128 functions to perform the coherent removal of interference. The demodulator circuit 124 is capable of locking and synchronizing due to the first stage non-coherent interference reduction performed by the interference estimation circuit 102, as will be described in more detail below.

Figure 4:
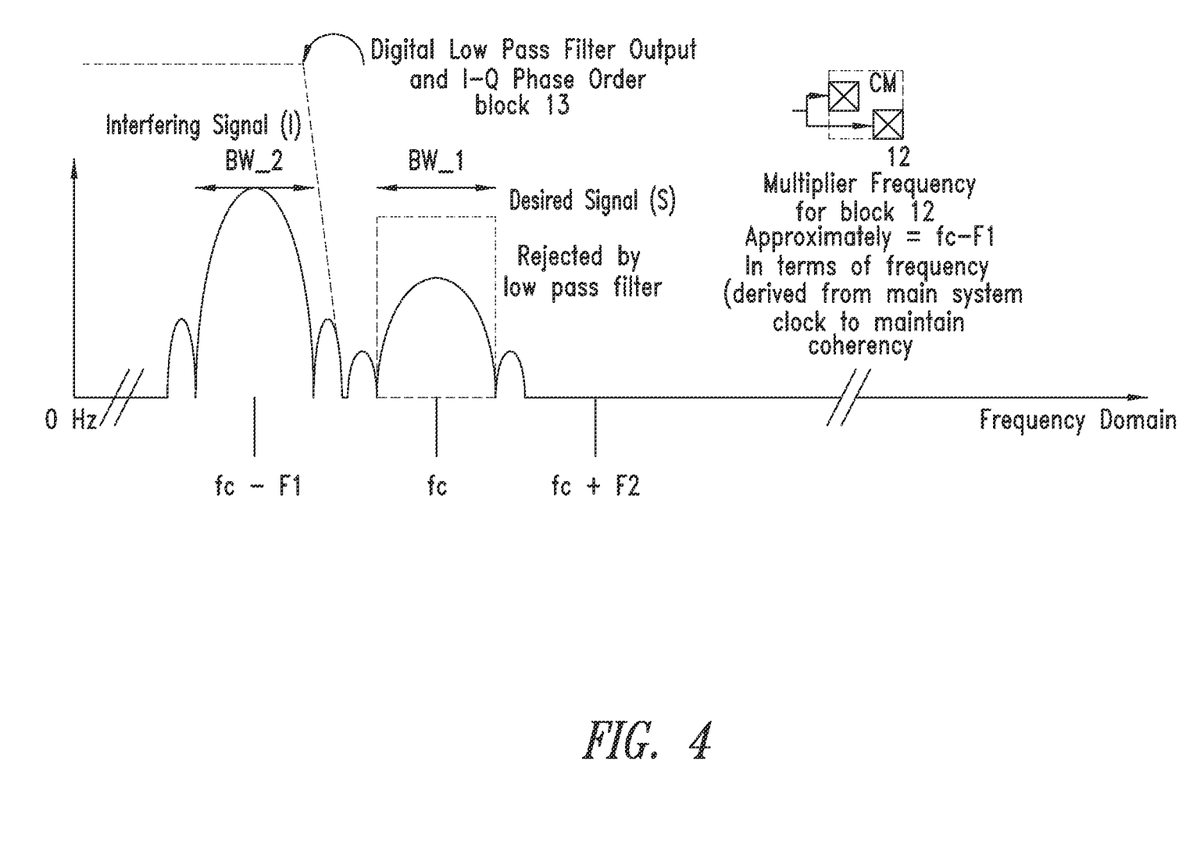
FIG. 4 is a graph showing the operation of the complex multiplier, adaptive low pass filter, and I-Q phase order filter of the adaptive filtering circuit of FIG. 1 in isolating the portion of the interfering signal of FIG. 3.

The second complex multiplier 120 receives the output from the I-Q phase order filter 118 an complex multiplies responsive to the clock signals from the second I-Q clock generator 122. These clock signals from the second I-Q clock generator have a frequency of approximately (fc-F1), where recall as discussed above the frequency F1 is the frequency of the in-band portion of the interfering signal I that is being removed. An adaptive low pass filter 130 then filters the output from the complex multiplier 120 to thereby isolate the in-band portion of the interfering signal I as shown in FIG. 4 by the dotted line. Thus, the output of the adaptive low pass filter 130 corresponds to the in-band portion of the interfering signal I that is being removed. A second I-Q phase order filter 132 receives the in-band interfering signal I from the adaptive low pass filter 130 (see FIG. 4) and functions to perform spectral and amplitude inversion of the in-band interfering signal I about the center frequency (fc-F1) of this signal. This is illustrated in FIG. 5, with the arrows illustrating the spectral inversion performed by the second I-Q phase order filter 132.

Figure 5:
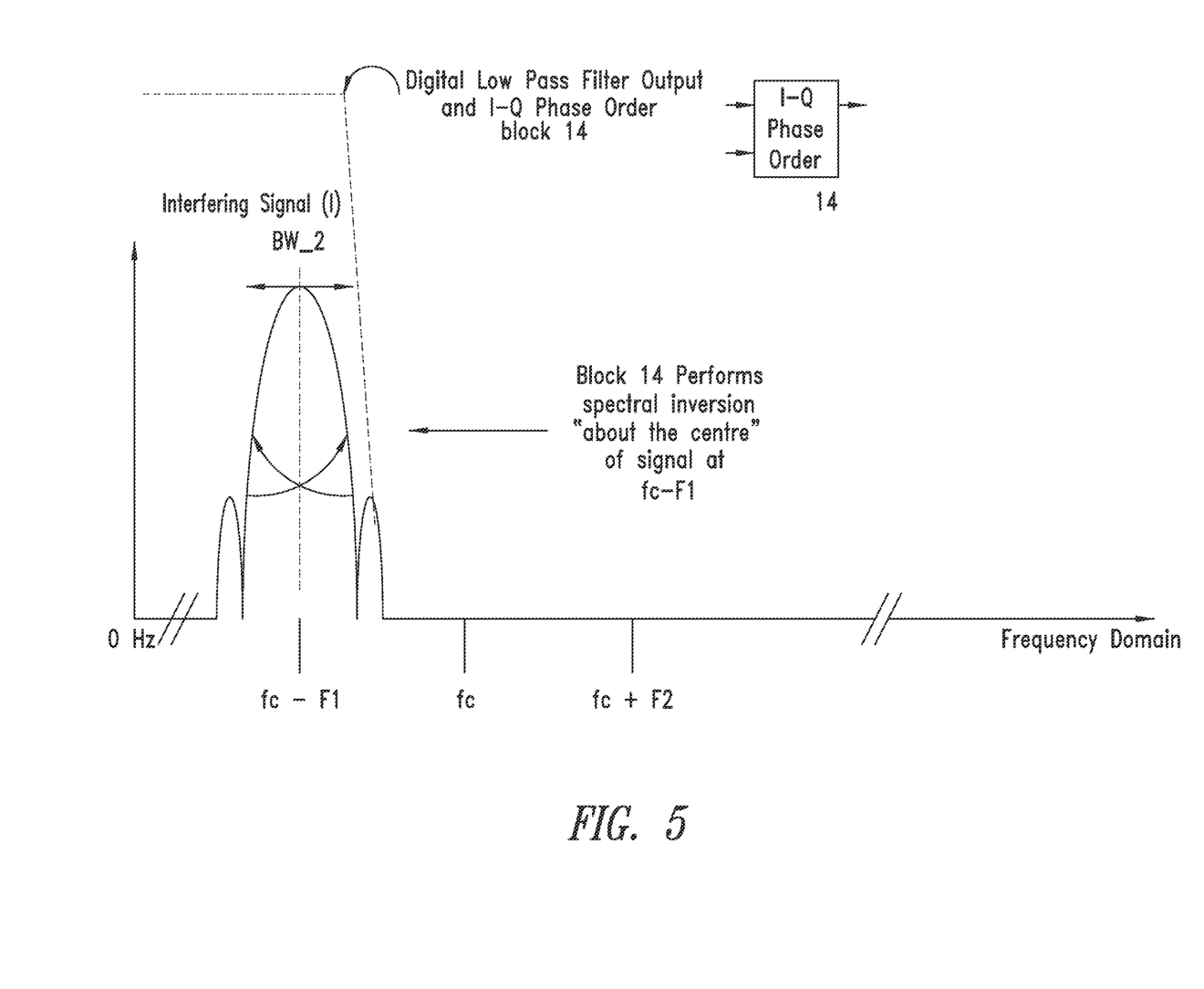
FIG. 5 is a graph showing the spectral inversion of the portion of the interfering signal of FIG. 4 that is performed by the I-Q phase order filter contained in the adaptive filtering circuit of FIG. 1.

At this point, the spectrally inverted in-band interference signal I output by the I-Q phase order filter 132 as illustrated in FIG. 5 is an estimate of the in-band portion of the interfering signal I to be removed. This estimate from the I-Q phase order filter 132 is then re-modulated so that it can then be subtracted from the input signal 106 prior to being demodulated by the demodulator 124, as will now be described in more detail. In order to do so, as seen in FIG. 1 the spectrally inverted in-band interference signal I output by the I-Q phase order filter 132 is supplied to a third complex multiplier 134 that performs complex multiplication on the signal estimate from the I-Q phase order filter 132 to return the signal estimate to its original spectral center frequency. A sin(x)/x compensation circuit 136 then receives the signal estimate from the complex multiplier 134 and filters that estimate, with the filtered estimate being supplied to a first digital-to-analog (DAC) converter 138. The compensation circuit 136 filtering ensures that the resultant estimate of the interfering signal I output by the digital-to-analog converter (DAC) 138 does not spectrally spill into the frequency band containing the signal of interest or desired signal S. The estimate of the interfering signal I output from the DAC 138 may be referred to as the "non-coherent estimate of the in-band interfering signal I" in the discussion below.

Figure 6:
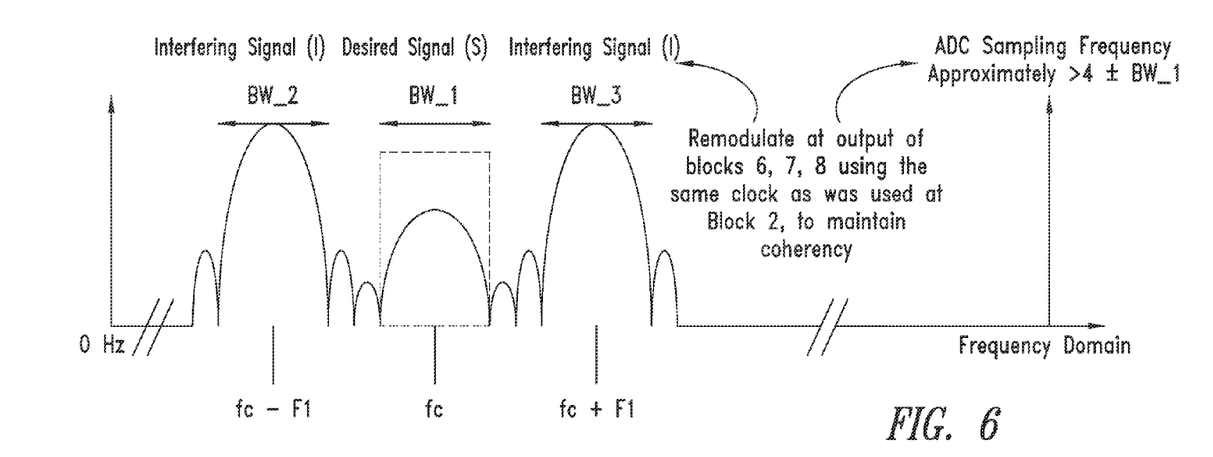
FIG. 6 is a graph showing the operation of the second complex multiplier, sin c(x) compensation circuit, and digital-to-analog (DAC) converter contained in the interference estimation circuit of FIG. 1 in re-modulation of the input signal.
Figure 7:
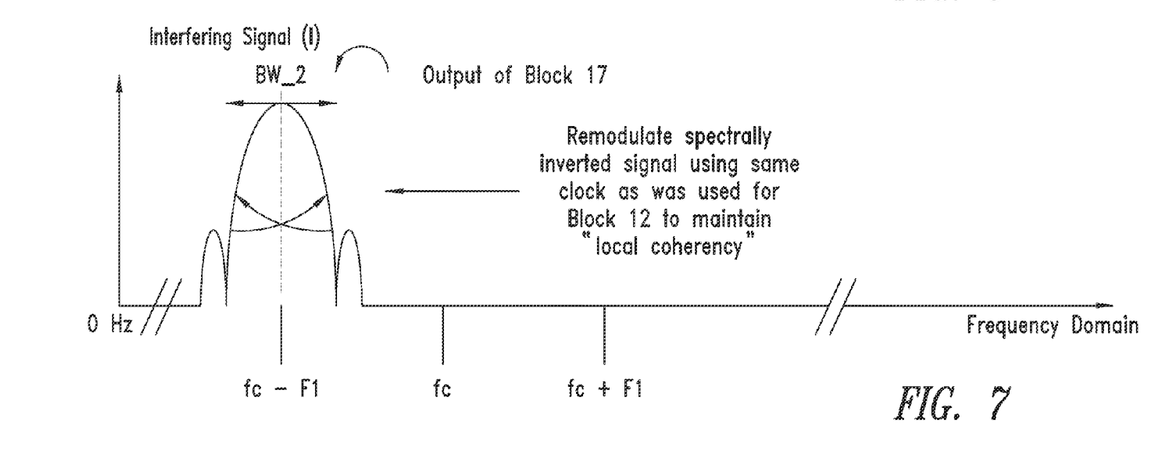
FIG. 7 is a graph showing the spectrally inverted estimate of the portion of the interfering signal of FIG. 5 after digital-to-analog conversion that is output from the adaptive filtering circuit of FIG. 1.
Figure 8:
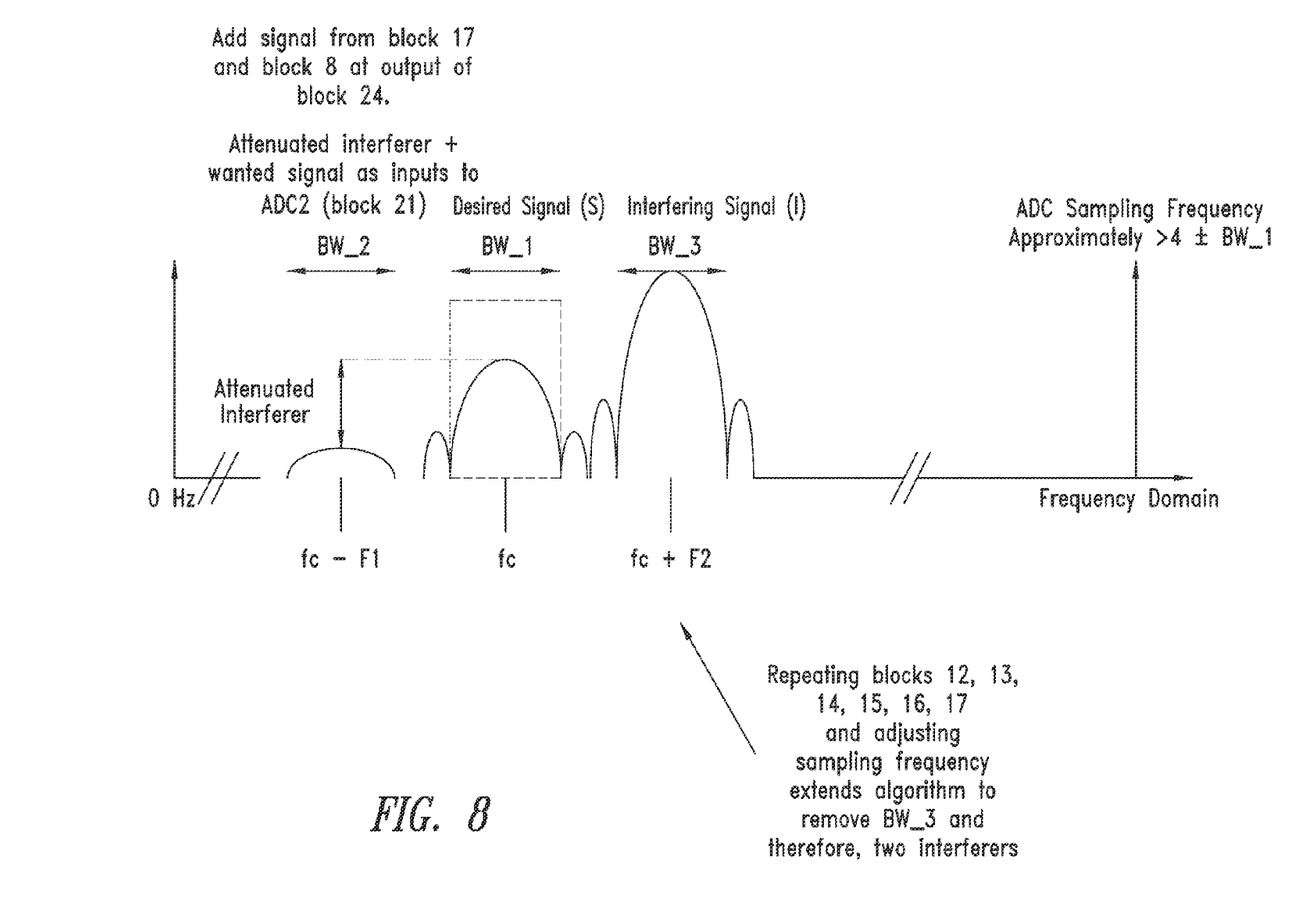
FIG. 8 is a graph showing the compensated input signal obtained by summing the signals of the graphs of FIGS. 6 and 7 to thereby remove or significantly reduce the interfering signal and on which on which analog-to-digital conversion and demodulation is ultimately performed by the demodulation circuit of FIG. 1.

In a similar way, a complex multiplier 140, sin(x)/x compensation circuit 142, and digital-to-analog converter (DAC) 144 operate in combination to receive the output signal from the I-Q phase order filter 118 and to re-modulate this signal to the passband. Thus, the output of the DAC 144 essentially represents the original input signal 106 supplied to the ADC 110. FIG. 6 illustrates the signal output from the DAC 144, and by comparing FIG. 6 to FIG. 2 this is seen to be the case. FIG. 7 illustrates the non-coherent estimate of the in-band interfering signal I output from the DAC 138 resulting from the operation of the operation of the complex multiplier 134, compensation circuit 136, and DAC 138. A summation circuit 146 sums the outputs from the DAC 144 and the DAC 138 and outputs this sum as an interference-corrected signal as illustrated in FIG. 8. A negative sign at the DAC 138 output being supplied to the summation circuit 146 indicates that the output from the DAC 138 is the non-coherent estimate of the in-band interfering signal I, which is the re-modulated spectrally inverted estimate of the in-band interference signal I.

FIG. 8 illustrates that the interference-corrected signal output from the summation circuit 146 has a greatly reduced in-band portion of the interfering signal I. Note that the out-of-band portion of the interfering signal I, namely that portion at center frequency fc-F2, remains in the interference-corrected signal output from the summation circuit 146 as shown in FIG. 8. If the removal of this out-of-band portion of the interfering signal I, or of other portions (not shown in the figures) is desired, the series-connected components 120-138 contained in the adaptive filtering circuit 104 are simply duplicated for each such portion to be removed. The sampling frequency and thus the frequency of the clock signals applied by the I-Q clock generator 122 to clock each such group of series-connected components is adjusted accordingly to thereby remove the desired portion of the interfering signal I. For example, if the output-of-band portion having bandwidth BW_3 shown in FIG. 8 is desired to be removed, the series-connected components 120-138 are duplicated and the sampling frequency adjusted accordingly, with the output of the DAC being another input to the summation circuit 146 to thereby remove the out-of-band portion of the interfering signal I shown in FIG. 8.

The interference-corrected signal output from the summation circuit 146 is input to an analog-to-digital converter (ADC) 148 that samples and digitizes this signal and provides corresponding digital values to the demodulator circuit 124 which, in turn, demodulates these digital values to obtain the original unmodulated I-Q encoded data.

In another embodiment, the interference cancellation circuit 102 of FIG. 1 further includes a delay circuit 150 including a second varactor variable filter 152, analog delay line 154, and summation circuit 156 coupled in series as shown. The varactor variable filter 152 is tuned to have a center frequency of the desired signal S and thus provides a delayed version of this signal to the summation circuit 156. Also in this embodiment, the variable varactor filter 108 is tuned such that the it passes the interfering signal I. In this embodiment the input signal 106 is filtered through the alternative path via the second programmable varactor tuned filter 152 and the analog delay line 154. This filter 152 isolates the desired signal in frequency and is delayed through the analog delay line 154 to compensate for the computation time required to compute the non-coherent estimate of the interfering vector by components 120-138. It must be noted, that the delay introduced by the analog delay line 154 is to be evaluated on an application by application basis, and if clocking constraints are not encountered then this delay circuit 150 is not required. In the first described embodiment, the required delay in incorporated into the adaptive low pass filter 116 and I-Q phase order filter 118.

Figure 9:
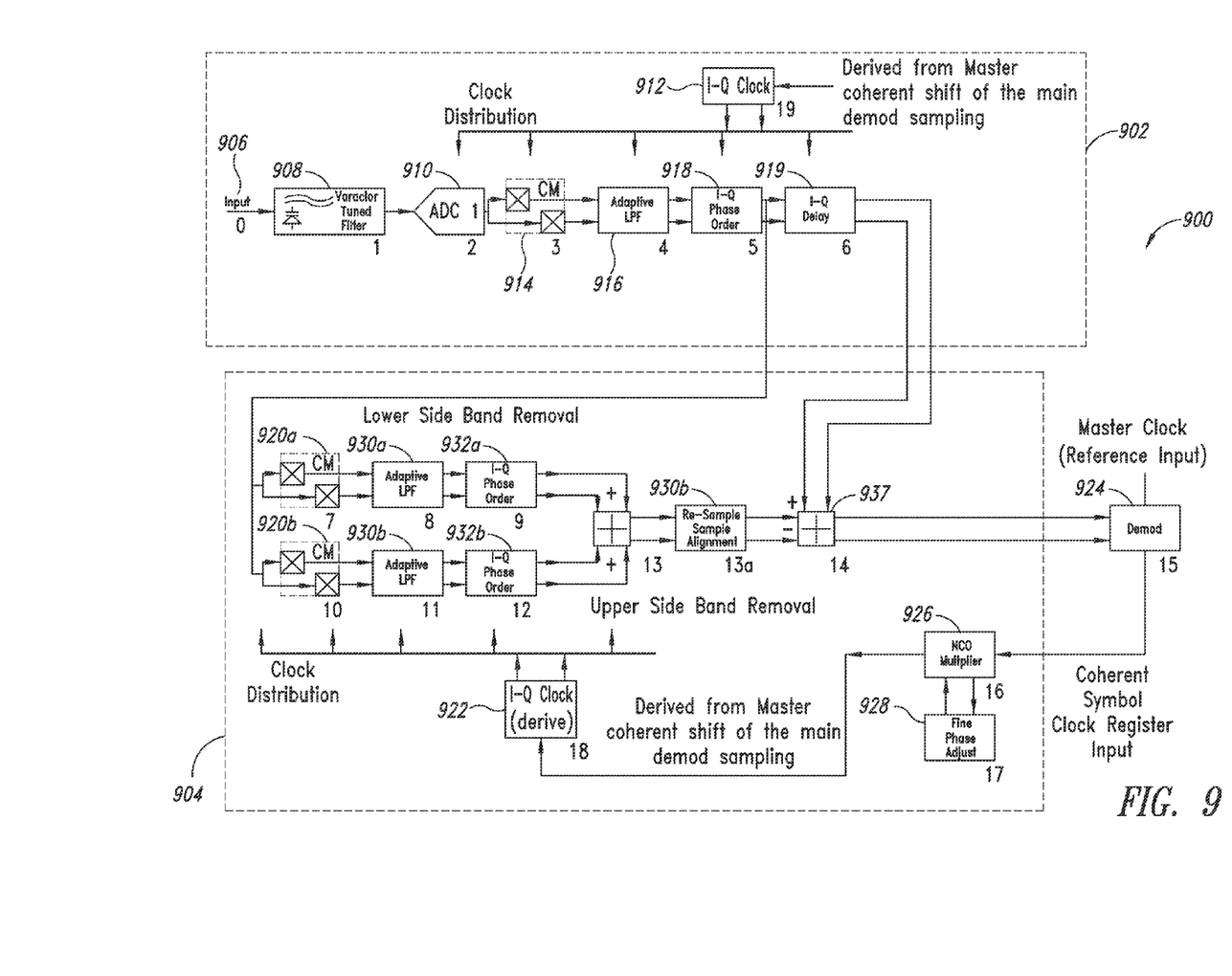
FIG. 9 is a functional block diagram illustrating an all-digital implementation of the interference estimation circuit and adaptive filtering circuits of FIG. 1 according to another embodiment.

FIG. 9 is a functional block diagram of a demodulation circuit 900 illustrating an all-digital implementation of the interference estimation circuit 902 and adaptive filtering circuit 904 of FIG. 1. The theory of operation of this embodiment is the same as previously described for the demodulation circuit 100 of FIG. 1. The components 900-932 operate in a similar manner to the corresponding components 100-132 of the demodulation circuit 100, and the demodulation circuit additionally includes a summation circuit 933, sample alignment circuit 935, and summation circuit 937 that operate on the corresponding digital values. Also, the demodulation circuit 900 includes components 920a-932a and 920b-932b that are coupled in parallel with outputs summed by the summation circuit 933 to thereby remove both the lower and upper side bands, which correspond to both the in-band and out-of-band portion of the interfering signal illustrated and described with reference to FIGS. 1-8.

Figure 10:
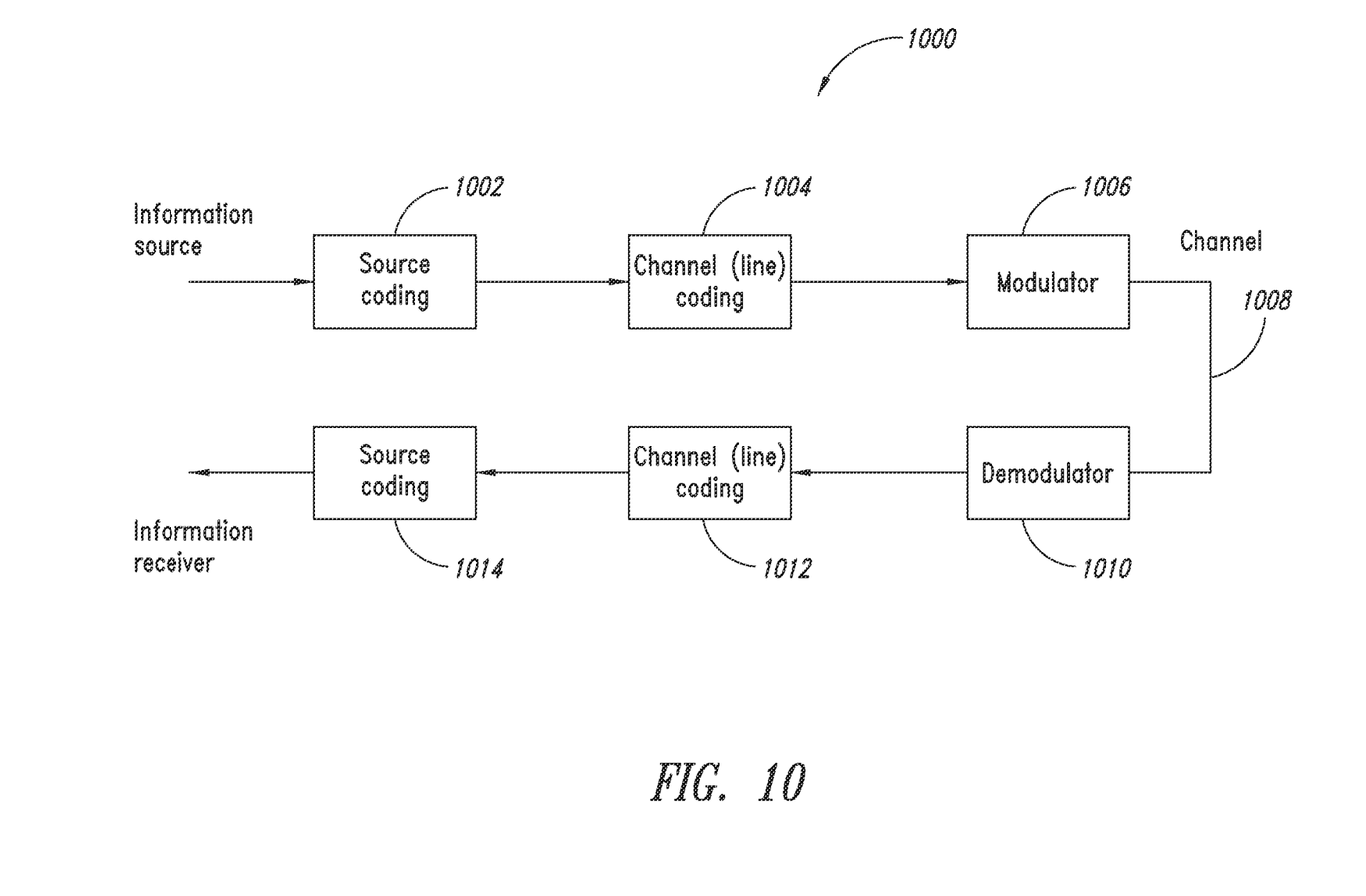
FIG. 10 is a functional block diagram of an electronic system such as a communications system including the demodulation circuit of FIG. 1 according to another embodiment.

FIG. 10 is a functional block diagram of an electronic system 100 such as a communications system including the demodulation circuit 100 of FIG. 1 according to another embodiment. An information source provides information to a source coding component 1002, which suitable encodes the information and provides the encoded information to a channel coding component 1004. The channel coding component likewise performs suitable channel coding on the received information and provides this encoded information to a modulator 1006. The modulator 1006 modulates the encoded information from the channel coding component 1004 and communications the suitably modulated information over a communications channel 1008, such as a wireless communications channel. A demodulator 1010 including the demodulation circuit 100 or 900 demodulates the received input signal from the communication channel 108 and provides this demodulated information to a channel decoding component 1012 and source decoding component 1014 which function to reverse the operations of the components 1004 and 1002. The source decoding component 1014 outputs received information which ideally corresponds to the information source supplied to the source coding component 1002.

The demodulation circuit 100 described in FIG. 1 can be significantly simplified if all the signal processing is accomplished in the digital domain. Once the ADC 110 has sampled the input signal 106, processing can be accomplished entirely digitally on two parallel paths. FIG. 10 shows the simplified digital cancellation circuit while the theory of operation is the same. The ADC 110 samples at 4 or 8 times the symbol rate of the input signal 106 or signal of interest. Removal of expensive additional ADCs and DACs is thus possible. Adjacent carriers, meaning the in-band and out-of-band portions of the interfering signal I need not be of the same modulation or format and the sampling process can operate as a coherent or non-coherent process.

Figure 11:
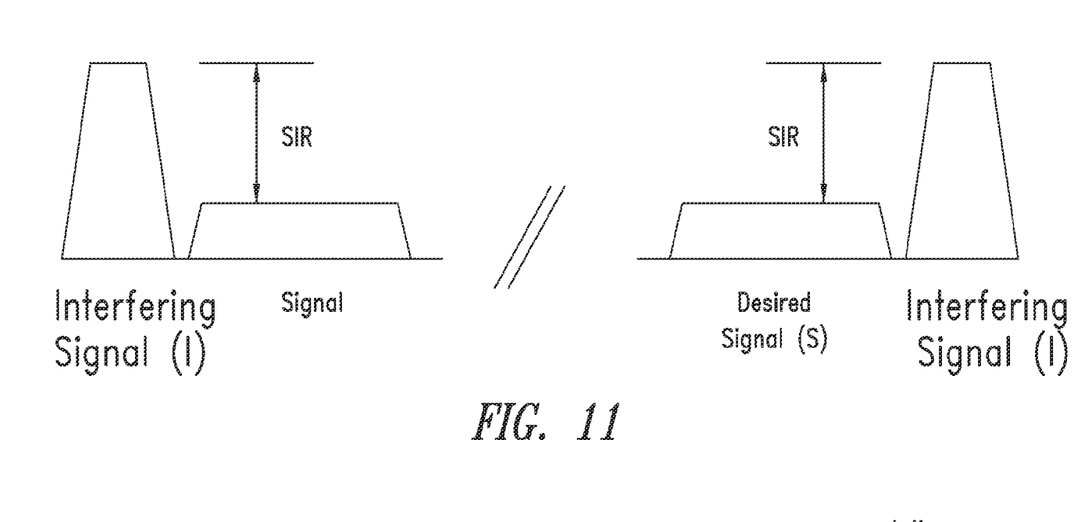
FIG. 11 is an alternative graph illustrating the desired signal S and interfering signal I present on the input signal of FIG. 1.
Figure 12:
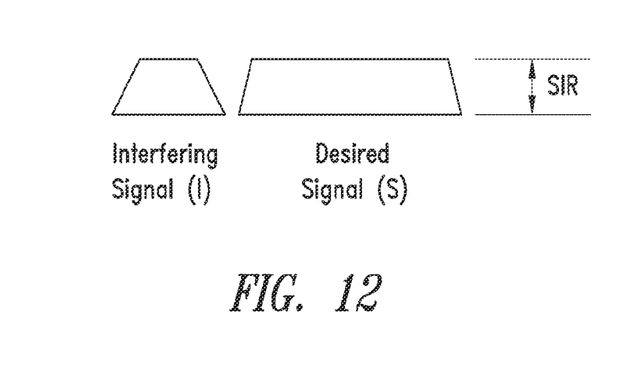
FIG. 12 is an alternative graph illustrating the input signal of FIG. 11 after the estimate of the interfering signal generated by the interference estimation circuit of FIG. 1 has been summed with the input signal to cancel or greatly reduce the interfering signal.
Figure 13:
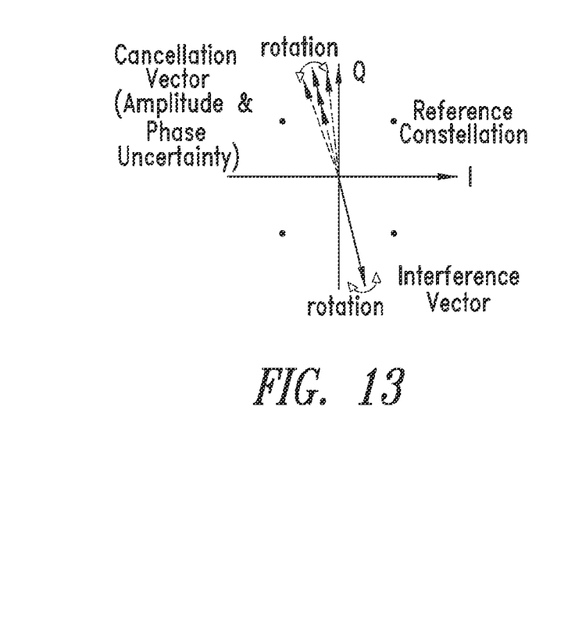
FIG. 13 is a polar graph illustrating the vector representation of the estimate of the interfering signal and the vector representation of the interfering signal of FIGS. 11 and 12.

FIG. 11 is an alternative representation of the input signal 106. FIG. 12 shows the interfering signal I canceled output. This block will take a signal to interference ratio of 30 to 40 dB and reduce the interference level to a range 5 to 15 dB. FIG. 13 shows the vector relationship of the input interference vector and the estimated cancellation vector (output from DAC 138). The jitter reflects the phase and amplitude estimate of the non-coherent computation and the fact that the clocking is non-coherent.

The adaptive filtering circuit of FIG. 1 performs the addition of "coherent cancellation and SNR enhancement". The non-coherent stage is a coarse method to remove interference. It allows for removal of energy, in the order of 10-30 dB a reduction sufficient to allow a demodulator or related receiver to acquire synchronization and lock. When the interfering signal and the desired signal are within 0 to 10 dB of each other in terms of relative power, the non-coherent method is not significantly effective. The coherent method offers significant other improvement towards enhancing the SNR and removing residual interference capable of degrading the receiver/demodulator performance.

Figure 14:
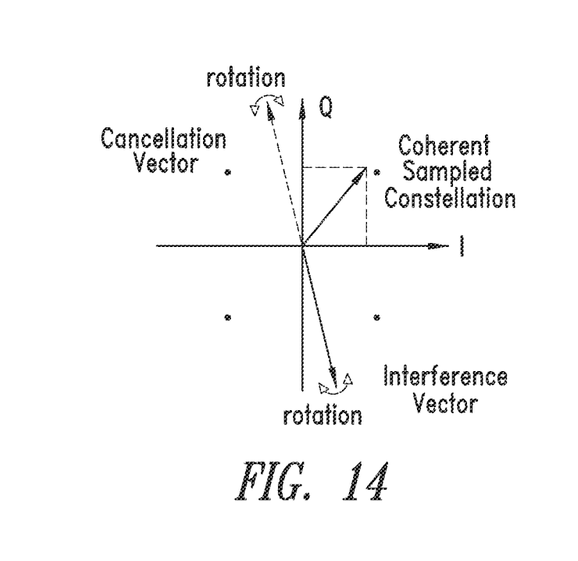
FIG. 14 is a graph illustrating a QPSK example for the concept of FIG. 13 and the interference estimation circuit of FIG. 1 in providing an estimate of the interfering signal to cancel the interfering signal present on the input signal of FIG. 1.
Figure 15:
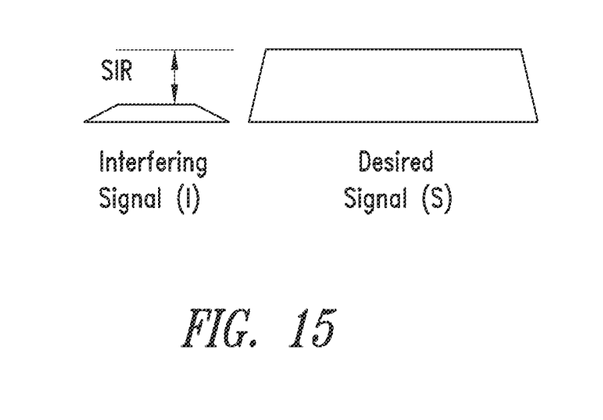
FIG. 15 is a graph illustrating the improved signal-to-interference ratio (SIR) of the input signal after processing of the input signal by the interference estimation circuit and adaptive filtering circuit of FIG. 1.

FIG. 14 shows the interference cancelling concept within a QPSK constellation. In the top right hand corner of FIG. 5 the vector corresponding to a synchronized sample. The ideal reference constellation points are shown in this figure. Several samples representing noise and channel degradations are shown clustered about the reference constellation point. Also shown in this figure is the interfering vector in the bottom right quadrant. The interference cancellation vector, corresponding to the output form the DAC 138, is also shown. This vector is rotating in the opposite direction of the interfering vector, with opposite amplitude and phase. Note that it is only required to cancel the interference at the sampling instance of time. FIG. 14 shows the output of the summation circuit 146 (FIG. 1). This embodiment of the demodulation circuit 100/900 provides interference and SNR enhancement as well as allowing the ADC 148 having a lower number of bits to be utilized.

Analysis and removal of in band interference is possible with the demodulation circuits 100/900 of FIGS. 1 and 9. The adaptive filter 130 can be structured to remove both in band and out of band interference.

The following equations provide a mathematical foundation for the operation of the previously described embodiments:

Input (0, FIG. 1): Signal at $\omega_1$, represents interferer, Signal at $\omega_2$, represents desired signal $$A_1 \cos(\omega_1 t + \phi_1) + A_2 \cos(\omega_2 t + \phi_2) \quad (1)$$

ADC 110:

$$A_1 \cos(\omega_1 t + \varphi_1) + A_k \cos(\omega_2 t + \varphi_2) \quad (2)$$

$$A_k = \frac{A_2}{k}$$

Complex Multiplier 114:

$$[A_1 \cos(\omega_1 t + \phi_1) + A_k \cos(\omega_2 t + \phi_2)][\cos(\omega_s t + \phi_x) + \sin(\omega_s t + \phi_x)] \quad (3)$$

I-Q Phase Order Filter 118:

$$\frac{A_1}{2}[\cos((\omega_s - \omega_1)t + \phi) - j\sin((\omega_s - \omega_1)t + \phi)] \quad (4)$$

Complex Multiplier 140: Spectrally inverted signal with non-coherent sampling errors embedded $$A_1(\pm \Delta)\cos\left(-\omega_1 \pm \frac{m}{n}\omega_s\right) \quad (5)$$

Where m/n is the sampling error term representing the non-coherent representation of the input interfering signal.

Coherent Cancellation:

Identical output to equation (5) above except that the ratio of (m/n) approaches 0 and Δ approaches "1".

Input to ADC 148:

Represents the required signal plus interfering signal attenuated by a factor of K, where K represents the attenuation due to the interference canceller non coherent and coherent final inversion of the interfering signal:

$$A_2\cos(\omega_2 t + \varphi_2) + \frac{A_1}{K}\cos(\omega_1 t + \varphi_1) \qquad (6)$$

One skilled in the art will understand that even though various embodiments and advantages have been set forth in the foregoing description, the above disclosure is illustrative only, and changes may be made in detail, and yet remain within the broad principles of the invention. Moreover, the functions performed by various components described above may be implemented through circuitry or components other than those disclosed for the various embodiments described above. Moreover, the described functions of the various components may be combined to be performed by fewer elements or performed by more elements, depending upon design considerations for the device or system being implemented, as will appreciated by those skilled in the art. Therefore, the present invention is to be limited only by the appended claims.

The invention claimed is:

1. A demodulation circuit, comprising:
an interference estimation circuit adapted to:
  receive an input signal having a desired signal component and an interfering signal component;
  sample the input signal to produce a plurality of digital values;
  perform a first complex multiplication on the plurality of digital values;
  filter values produced by the complex multiplication to generate an interference estimation signal from the input signal;
  re-modulate the interference estimation signal to produce a representation of the input signal;
  perform a second complex multiplication on the interference estimation signal; and
  filter product values from the second complex multiplication to isolate an in-band portion of the interfering signal component;
an adaptive filtering circuit coupled to the interference estimation circuit and operable to perform spectral and amplitude inversion on the in-band portion of the interfering signal component to obtain a spectrally inverted in-band interference signal, the adaptive filtering circuit further operable to re-modulate the spectrally inverted in-band interference signal to obtain an inverted signal; and
a summing circuit coupled to the adaptive filtering circuit and operable to sum the inverted signal and the input signal to substantially cancel interference contained in the input signal.

2. The demodulation circuit of claim 1, wherein the adaptive filtering circuit is operable to generate the inverted signal to cancel both in band and out of band interference present on the input signal.

3. The demodulation circuit of claim 2, wherein the adaptive filtering circuit is operable to cancel one of two adjacent interfering signals.

4. The demodulation circuit of claim 3, wherein the adaptive filtering circuit is operable to cancel both adjacent interfering signals.

5. The demodulation circuit of claim 1, wherein the interference estimation circuit and the adaptive filtering circuit are entirely digital circuits.

6. The demodulation circuit of claim 1, wherein the interference estimation circuit comprises:
an analog-to-digital converter adapted to receive the input signal having the desired signal component and the interfering signal component;
a complex multiplier circuit coupled to the analog-to-digital converter;
an adaptive low pass filter having an input and an output, the input of the adaptive low pass filter coupled to the complex multiplier circuit; and
an I-Q phase order circuit having an input and an output, the input of the I-Q phase order circuit coupled to the output of the adaptive low pass filter.

7. The demodulation circuit of claim 6, further comprising an I-Q delay circuit coupled to the output of the I-Q phase order circuit.

8. A method of demodulation, comprising:
receiving an input signal at an input of an interference estimation circuit, the input signal having a desired signal component and an interfering signal component;
generating from the input signal, with the interference estimation circuit, an interference estimation signal, said generating including:
  sampling the input signal to produce a plurality of digital values;
  performing a first complex multiplication on the plurality of digital values; and
  filtering values produced by the complex multiplication to isolate the interference estimation signal;
isolating an in-band portion of the interfering signal component, said isolating including:
  re-modulating the interference estimation signal to produce a representation of the input signal;
  performing a second complex multiplication on the interference estimation signal; and
  filtering values produced by the second complex multiplication to isolate the in-band portion of the interfering signal component;
performing, with an adaptive filtering circuit, a spectral and amplitude inversion on the interference estimation signal to obtain a spectrally inverted in-band interference signal;
re-modulating the spectrally inverted in-band interference signal to produce an inverted signal; and
applying the inverted signal to the input signal to substantially cancel interference contained in the input signal.

9. The method of demodulation of claim 8, wherein applying the inverted signal to the input signal cancels both in band and out of band interference present on the input signal.

10. The method of demodulation of claim 9, wherein applying the inverted signal to the input signal cancels one of two adjacent interfering signals.

11. The method of demodulation of claim 10, wherein applying the inverted signal to the input signal cancels both adjacent interfering signals.

12. The method of demodulation of claim 8, comprising:
forming the interference estimation circuit and the adaptive filtering circuit from entirely digital circuitry.

13. The method of demodulation of claim 8, comprising:
passing the input signal to an analog-to-digital converter, the input signal having the desired signal component and the interfering signal component;
passing the plurality of digital values produced a complex multiplier circuit; and producing, values with the complex multiplier circuit, the values including a baseband signal.

14. A method to detect and remove an interfering portion of a signal having the interfering portion and a desired portion, the method comprising:
receiving an input signal at an input of an analog-to-digital converter, the input signal having a desired signal component and an interfering signal component;
sampling the input signal with the analog-to-digital converter to produce a plurality of digital values;
performing a first complex multiplication on the plurality of digital values;
filtering values produced by the complex multiplication to isolate an estimate of the interfering signal component;
re-modulating the estimate of the interfering signal component to produce a representation of the input signal;
performing a second complex multiplication on the estimate of the interfering signal component;
filtering product values from the second complex multiplication to isolate an in-band portion of the interfering signal component;
performing spectral and amplitude inversion of the in-band portion of the interfering signal component to produce a spectrally inverted in-band interference signal;
re-modulating the spectrally inverted in-band interference signal to produce a representation of an interference signal to be removed; and
summing the representation of the input signal with the representation of the interference signal to be removed to produce an interference-corrected signal.

15. The method of claim 14, comprising:
producing the input signal from a variable filter, the variable filter receiving a composite signal having the desired signal component, the interfering signal component, and at least one other undesirable signal component.

16. The method claim 14, wherein sampling the input signal with the analog-to-digital converter includes adhering to a Nyquist sampling theorem.

17. The method claim 14, wherein performing the first complex multiplication produces a baseband I-Q sample set.

18. The method claim 14, wherein filtering values produced by the complex multiplication includes filtering with an adaptive low pass filter, an I-Q phase order filter, or both the adaptive low pass filter and the I-Q phase order filter.

19. The method claim 14, wherein re-modulating the estimate of the interfering signal component comprises:
performing a third complex multiplication with the estimate of the interfering signal component;
compensating the product of the third complex multiplication with a sin(x)/x compensation circuit; and
passing an output of the sin(x)/x compensation circuit through a digital-to-analog circuit.

20. The method claim 19, wherein re-modulating the spectrally inverted in-band interference signal comprises:
performing a fourth complex multiplication with the spectrally inverted in-band interference signal;
compensating the product of the fourth complex multiplication with a second sin(x)/x compensation circuit; and
passing an output of the second sin(x)/x compensation circuit through a second digital-to-analog circuit.

* * * * *